United States Patent [19]

Hori et al.

[11] 4,023,791
[45] May 17, 1977

[54] SEMI-AUTOMATIC DOCUMENT FEEDER

[75] Inventors: Tatsu Hori, Los Altos; Kenneth W. Gardiner, Menlo Park; Norman F. Mangal, Palo Alto, all of Calif.

[73] Assignee: Savin Business Machines Corporation, Valhalla, N.Y.

[22] Filed: Oct. 23, 1975

[21] Appl. No.: 624,860

[52] U.S. Cl. .................................. 271/3; 271/4; 271/246; 271/273

[51] Int. Cl.² .................... B65H 3/04; B65H 9/06; B65H 29/14

[58] Field of Search ............. 271/3, 4, 10, 12, 245, 271/246, 273–275, 64; 355/3 R, 14

[56] References Cited

UNITED STATES PATENTS

| | | | |
|---|---|---|---|
| 3,199,864 | 8/1965 | Irvine | 271/272 |
| 3,499,374 | 3/1970 | Galster et al. | 355/3 R |
| 3,637,203 | 1/1972 | French | 271/246 |
| 3,667,752 | 6/1972 | Samczyk | 271/275 |
| 3,684,367 | 8/1972 | Vassitch | 355/14 |
| 3,700,231 | 10/1972 | Aasen et al. | 271/64 |
| 3,747,918 | 7/1973 | Margulis et al. | 271/4 |
| 3,770,348 | 11/1973 | Martin | 355/14 |
| 3,829,083 | 8/1974 | Shiina et al. | 271/4 |
| 3,844,552 | 10/1974 | Bleau et al. | 271/246 |

*Primary Examiner*—Robert W. Saifer
*Attorney, Agent, or Firm*—Shenier & O'Connor

[57] ABSTRACT

A semi-automatic document feeder for use with a photocopying machine in which each of a plurality of parallel spaced belts supported by first and secondary pulley assemblies has a lower traverse running across the machine imaging platen. Documents which are introduced to the feeder through an entrance port located near the top of one of said pulley assemblies, are guided around said pulley assembly onto a lower transport path defined by the plurality of belts and the imaging platen, and are stopped for copying by a gate located on the opposite edge of the machine platen and arranged to be moved into and out of the path of a document.

32 Claims, 9 Drawing Figures

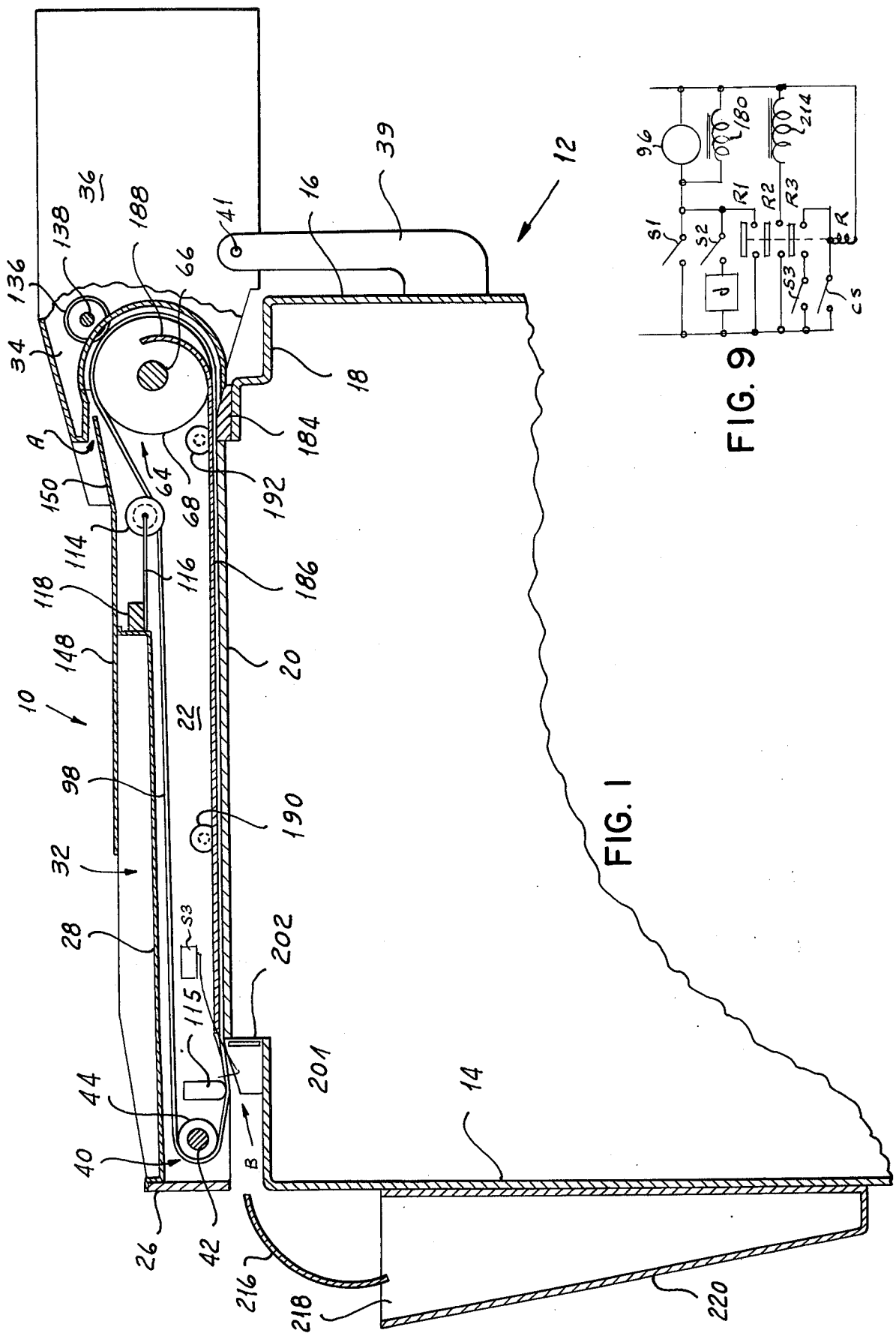

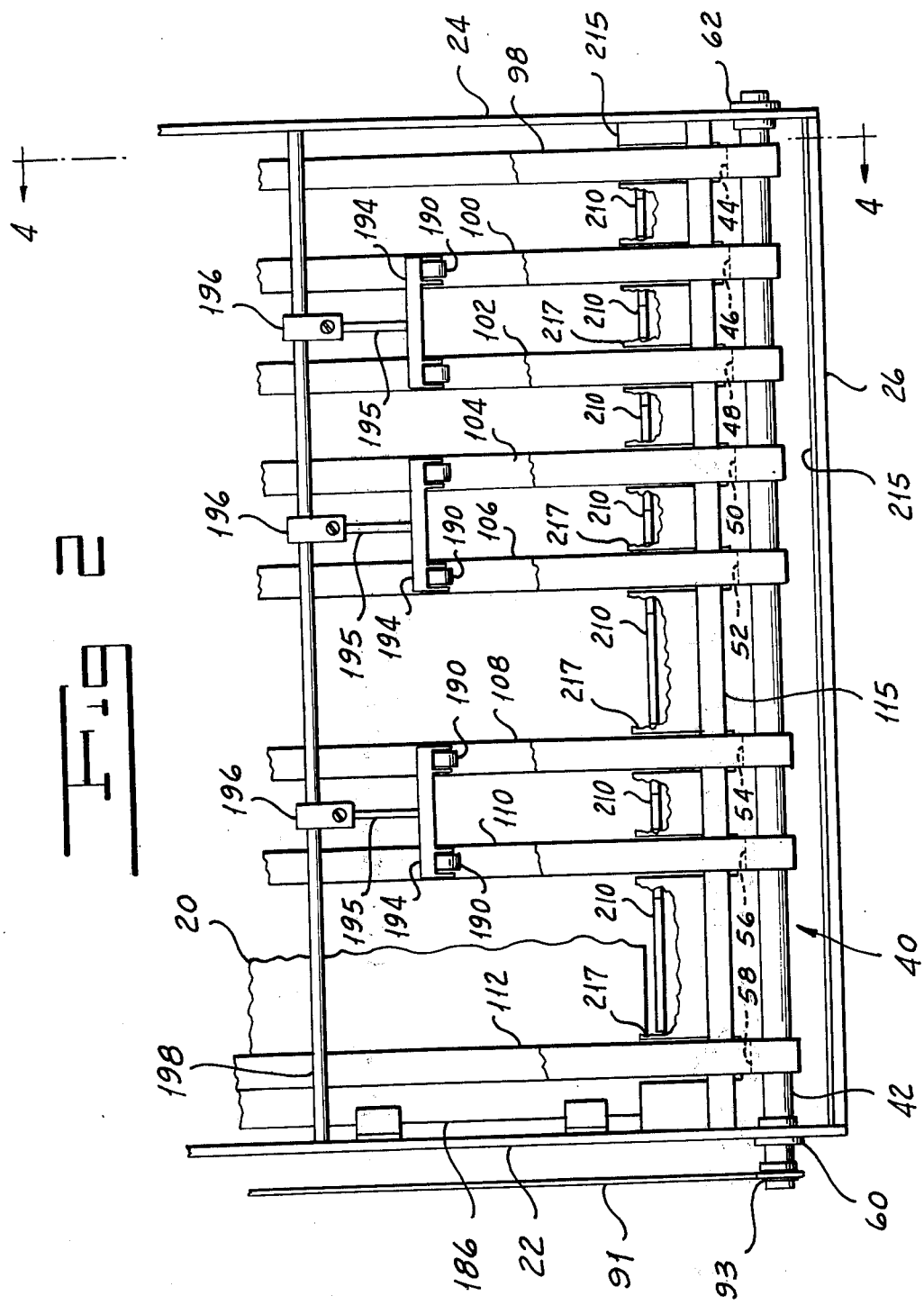

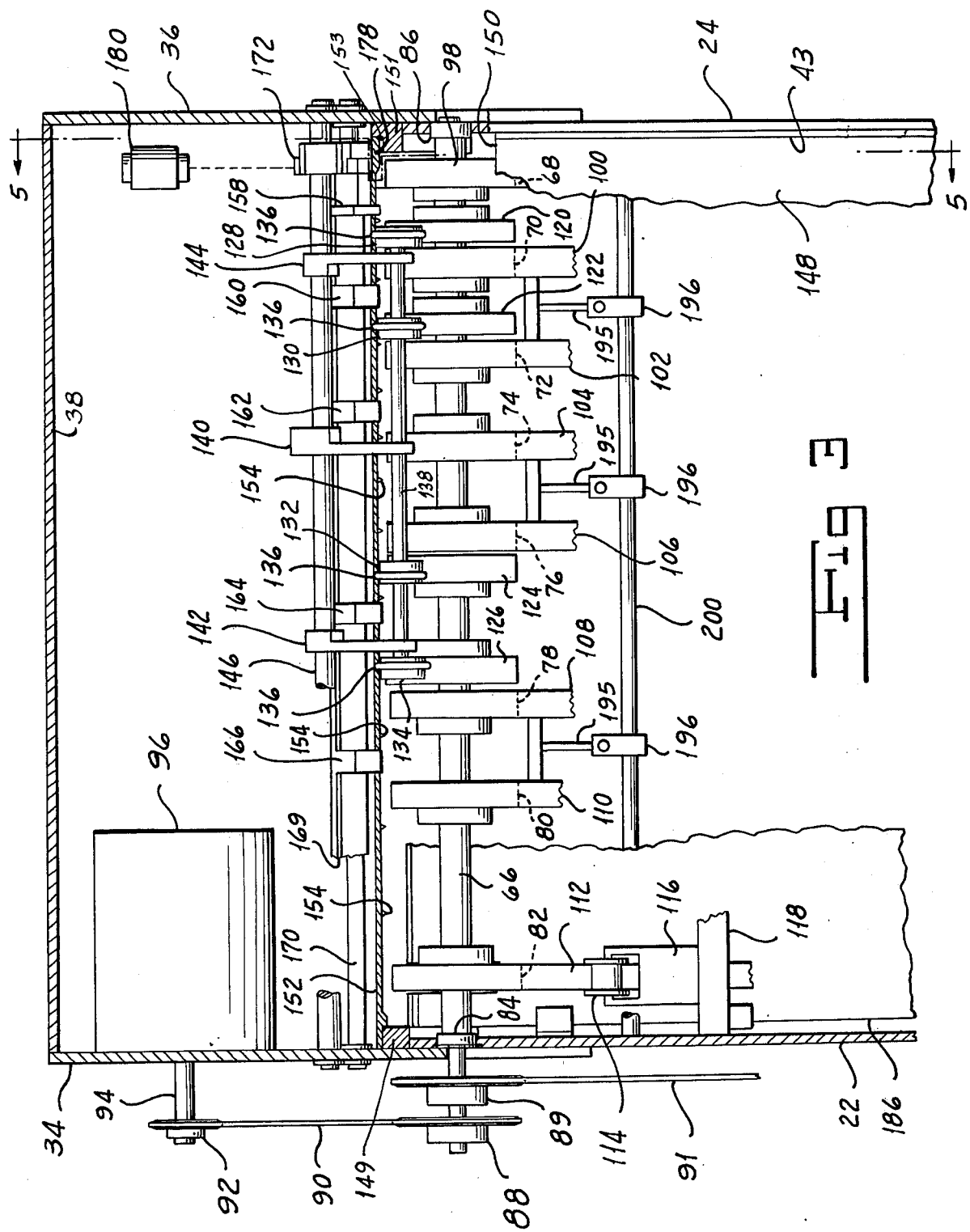

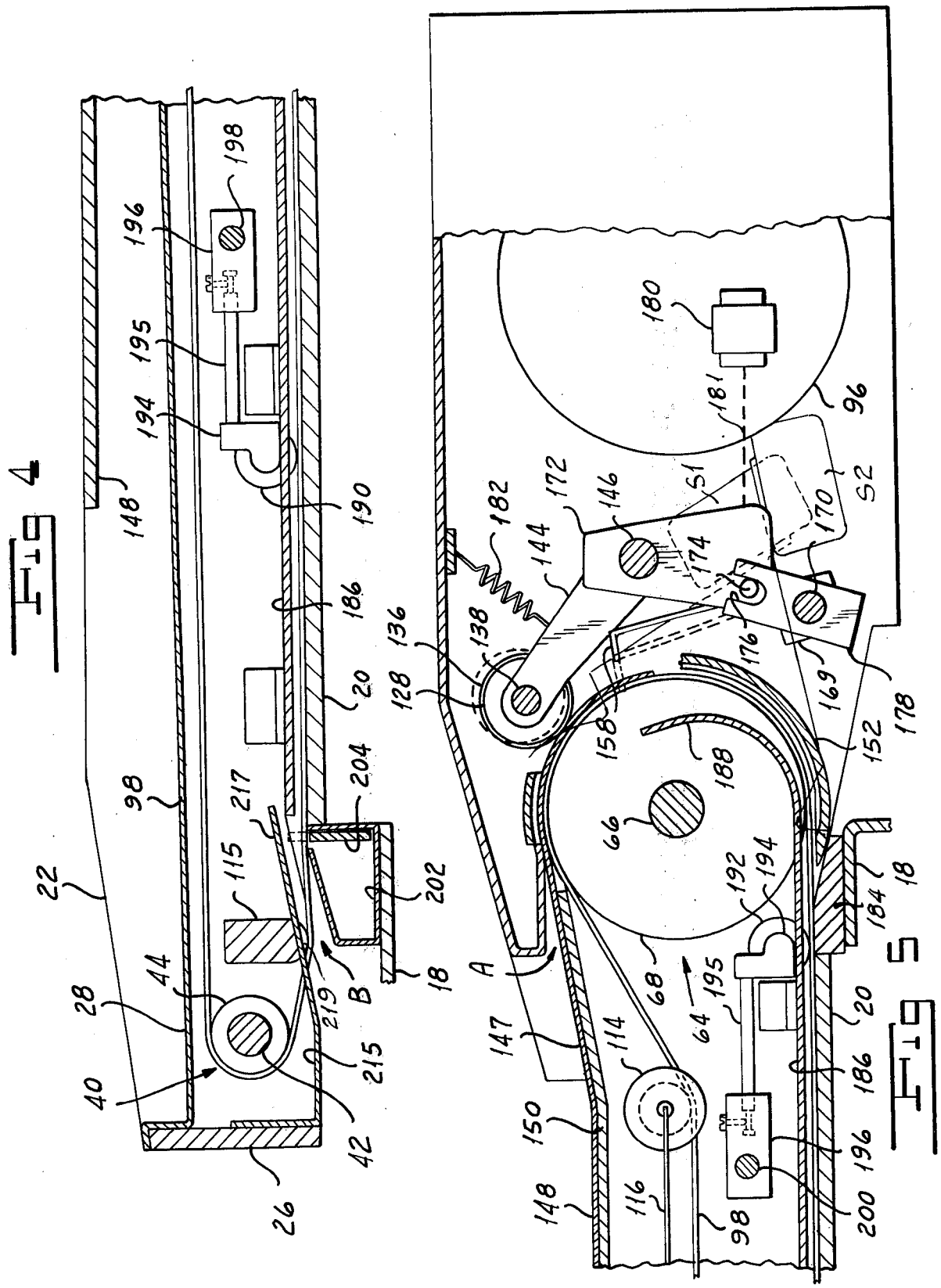

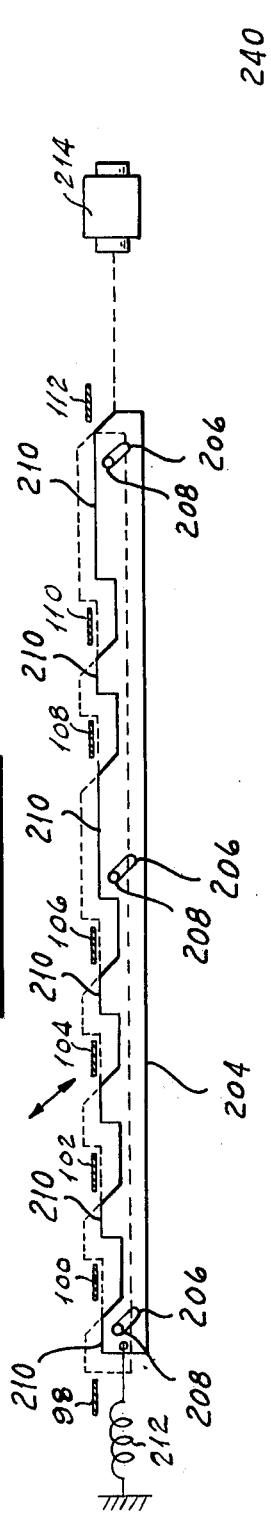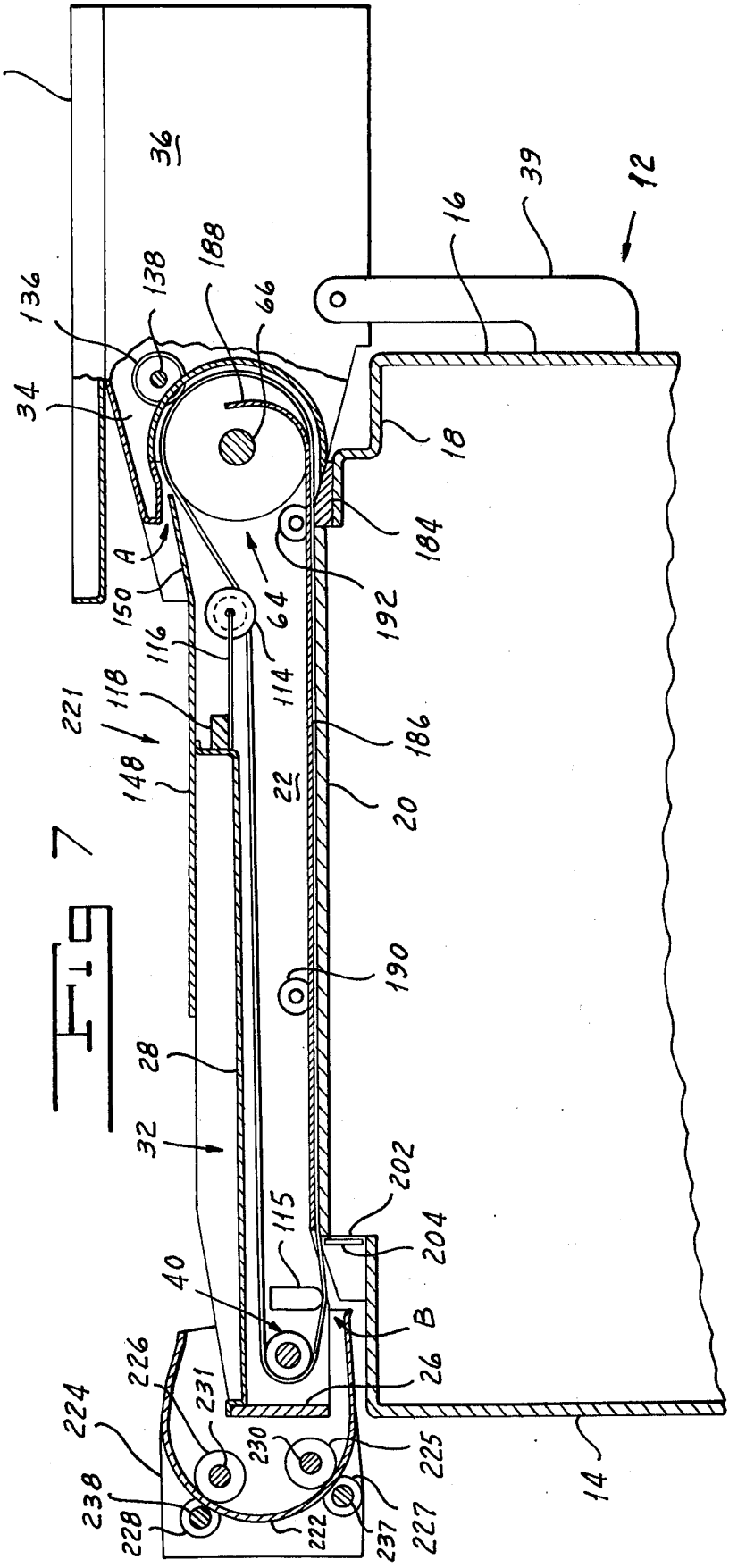

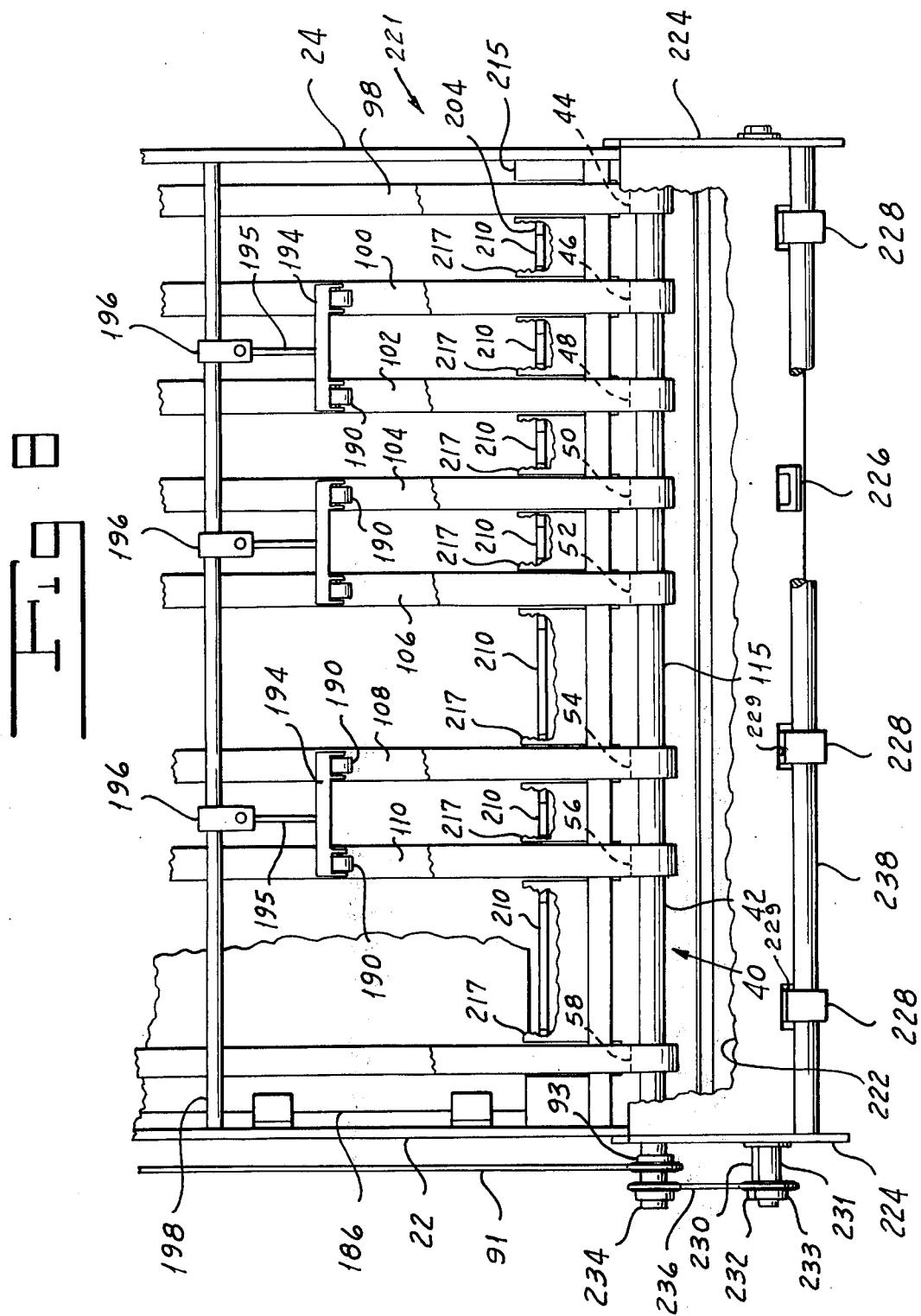

SEMI-AUTOMATIC DOCUMENT FEEDER

BACKGROUND OF THE INVENTION

This invention relates to a document feeder for use with a photocopying machine.

Semi-automatic document feeders which are fed individual sheets manually, but which position, discharge, and stack such sheets automatically are known in the art. One such feeder of the prior art is designed for use with a copying machine having an upwardly facing glass platen for receiving documents for copying. In this feeder, documents are fed manually face-down to the platen from the front thereof, and are moved by light transport belts backward along the surface of the platen until the leading or rearmost document edge is aligned with the rear edge of the platen. At that time a plurality of fingers extending upwardly along said rear edge of the platen stop the document for copying. The belts are made of low friction material to permit the document to slide relative thereto. When copying is complete, the fingers retract to allow the document to be carried to the rear of the machine to be discharged into a collection tray. Not only does such an arrangement enhance operating convenience, but it also increases the effective copying rate from about 10 copies per minute to a rate of about 20 to 30 copies per minute.

Such machines of the prior art possess several inherent design disadvantages, however. Since the collection tray for the original document is necessarily located in the rear of the machine, the operator must periodically reach back behind the machine to retrieve documents which have been copied. This operation is awkward and inconvenient. Secondly, if a multi-page original is supplied to the feeder last page first in order to cause the copies to be delivered in the proper order, the original pages will be collected in the reverse order and must be rearranged manually.

SUMMARY OF THE INVENTION

One of the objects of our invention is to provide a semi-automatic document feeder which both accepts documents from and discharges documents toward the front of the machine.

Another object of our invention is to provide a semi-automatic document feeder which stacks the originals in the same order as the copies.

Other and further objects of our invention will appear from the following description.

In general our invention contemplates the provision of a semi-automatic document feeder for a copying machine having an original-receiving platen extending from the front to the back of the machine and in which feeder a document inserted face-up into the upper end of a semicircular guide located above and at the rear of the platen is carried by a conveyor around the guide through the lower end thereof and face-down forwardly along the platen to a copying position at which its movement is arrested by a stop adapted to move into and out of the path of the document. When the copying operation is complete, the stop is moved out of the document path to permit the conveyor to deliver the document to a receptacle at the front of the machine.

Preferably, the conveyor is made up of a plurality of parallel spaced belts extending between a plurality of roller assemblies, including a drive roller assembly located behind the machine platen and a take-up roller assembly located in front of the platen. The stop may be a retractable "fence" having a plurality of fingers extending upwardly between the individual belts comprising the conveyor loop. When copying is complete, the fence retracts to allow the document to leave the feeder and fall into a stacking bin arranged on the front of the machine.

Preferably, the collecting apparatus includes a curved guide located at the discharge end of the machine platen for deflecting documents downward, and a bin having a forwardly canted front wall for collecting the deflected documents vertically. Alternatively, the collecting apparatus may include an upwardly curved guide for directing documents upward into an integral collection tray located above the spaced belts. By virtue of these arrangements, the stacking order of the original documents is made to conform with that of the copies.

BRIEF DESCRIPTION OF THE DRAWINGS

In the accompanying drawings which form part of the instant specification and which are to rear in conjunction therewith and in which like reference numerals are used to indicate like parts in the various views:

FIG. 1 is a fragmentary section of a copying machine provided with one embodiment of our semi-automatic document feeder.

FIG. 2 is a fragmentary top plan of the forward portion of the embodiment of our semi-automatic feeder shown in FIG. 1, with parts broken away.

FIG. 3 is a fragmentary top plan of the rear portion of the embodiment of our semi-automatic document feeder shown in FIG. 1, with parts broken away and with other parts in section.

FIG. 4 is an enlarged section of the forward portion of our semi-automatic document feeder, taken along line 4—4 of FIG. 2.

FIG. 5 is an enlarged section of the rear portion of our semi-automatic document feeder, taken along line 5—5 of FIG. 3.

FIG. 6 is a fragmentary section of our semi-automatic document feeder illustrating the operation of the exit gate of the embodiment shown in FIG. 1.

FIG. 7 is a section of an alternative embodiment of our semi-automatic document feeder having an integral collection tray.

FIG. 8 is a fragmentary top plan of the forward portion of the embodiment of our semi-automatic document feeder shown in FIG. 8.

FIG. 9 is a schematic view of one form of control circuit which may be used with our document feeder.

DETAILED DESCRIPTION OF THE PREFERRED EMBODIMENT

Referring now to FIGS. 1 to 3 of the drawings, our document feeder, indicated generally by the reference character 10, is designed to rest upon a photocopying machine indicated generally by the reference character 12 having a front wall 14, a rear wall 16, and an upper wall 18 which supports a glass imaging platen 20. The machine 12 is of the type in which documents are to be aligned with a lateral edge against the front edge of the machine platen 20 and with a top or bottom edge against the right edge of the platen 20; machines having a left edge alignment may be accommodated by simply reversing the parts of the feeder. The feeder 10 includes a left side plate 22 and a right side plate 24 extending generally along the sides of the machine platen 20 and joined by a front wall 26. A sheet support plate 28 is disposed between plates 22 and 24 near the front of the feeder 10 to form a document storage area 32 near the front of the feeder which may be used, for example, to temporarily stack originals to be copied. A pair of left and right rear side plates 34 and 36 of the feeder frame are secured to the rear portions of the plates 22 and 24, respectively, and are connected by a rear plate 38. Brackets 39 on the machine 12 carry pivot pins 41 extending into feeder frame rear side plate 34 and 36 to permit the entire feeder assembly to be swung away from the machine platen 20 to permit thick originals such as books to be copied. Right side plate 24 is additionally provided with a sheet aligner 43 fastened to the inner surface of the upper rear portion of plate 24.

The conveyor of our document feeder includes a front pulley assembly indicated generally by the reference character 40 comprising a shaft 42 and a plurality of pulleys 44, 46, 48, 50, 52, 54, 56 and 58 mounted on the shaft 42 at spaced locations therealong. Bearings 60 and 62, received in left and right side plates 22 and 24 near their front ends at points ahead of the forward edge of the platen 20, support shaft 42 for rotary movement. A rear pulley assembly indicated generally by the reference character 64 includes a shaft 66 and a plurality of pulleys 68, 70, 72, 74, 76, 78, 80 and 82 mounted at spaced locations on the shaft 66. Bearings 84 and 86, received in left and right side plates 22 and 24 at points behind the rear edge of the machine platen 20, rotatably support shaft 66. The left end of shaft 66 as viewed in FIG. 3 extends beyond side plates 22 to receive a sprocket wheel 88, coupled by a silent drive chain 90 to another sprocket wheel 92 received on the shaft 94 of a drive motor 96 mounted on the inner wall of left rear side plate 36. Shaft 66 also receives a second sprocket wheel 89 coupled by a drive chain 91 to a sprocket wheel 93 mounted on the first pulley assembly shaft 42. Sprocket wheels 89 and 93 are proportioned in size to drive the front and rear pulleys at the same peripheral velocity.

A plurality of individual drive belts 98, 100, 102, 104, 106, 108, 110 and 112 are supported between respective pulleys of the front and rear pulley assemblies 40 and 64 to form a conveyor loop. Preferably, the belts of the conveyor loop are approximately ½ inch wide by 1/64 inch thick and are made of cloth-based neopreme or of cloth-based synthetic rubber sold by E. I. duPont de Nemours & Co. under the trademark "Hypalon." A plurality of flanged tensioning pulleys 114 rotatably mounted to the ends of resilient metal strips 116, the other ends of which are secured to a support bar 118 transversely mounted between side plates 22 and 24, provide belts 98 through 112 with a suitable amount of tension.

As can be seen by reference to FIG. 4, a rounded guide bar 115 extending across the front of the document feeder 10 between the front edge of the machine platen and the pulley assembly 40 engages the belts 98 to 112 to hold the lower stands thereof in contact with the upper surface of platen 20.

When a document such as a sheet of paper is to be copied, it is placed faceup on a platform 148 supported between side plates 22 and 24. The sheet 147 is then advanced manually along the platform 148 to a document intake point A located near the upper end of the second pulley assembly 64. Preferably, the platform 148 is provided with a ramp 150 at the rear thereof to give the document some rigidity as it enters the feeder through the document intake point A. The document is then directed around the pulley assembly 64 along a transport path defined by a cylindrical guide 152 which extends between left and right end collars 149 and 151 secured to the left and right rear side plates 34 and 36, respectively. The right end collar 151 is provided with a circumferential paper-receiving groove 153 flush with the alignment plate 43. The cylindrical guide 152 is preferably formed with a plurality of circumferential ribs 154 on its inner surface to minimize skewing of the document 147.

Referring now to FIGS. 3 and 5, we provide the feeder intake end with a plurality of fingers 158, 160, 162, 164 and 166 which are adapted selectively to be moved through suitable openings in guide 152 and across the transport path defined by the cylindrical guide 152 to prevent the document from moving past a predetermined point on said path. Fingers 158 through 166 are preferably stamped or are otherwise formed from a single piece of metal or other material. We secure this member to a metal block 169 carried by a shaft 170 rotatably mounted in plates 34 and 36 to permit pivotal movement of the fingers into and out of the document transport path.

A plurality of drive rollers 120, 122, 124 and 126, mounted on the second pulley assembly shaft 66 at spaced locations from the right end thereof as viewed in FIG. 3 and having the same diameter as rollers 68 to 82, assist in driving a document around the transport path defined by cylindrical guide 152. Preferably, we form rollers 120 to 126 of a suitable low friction material such as the thermoplastic resin sold by E. I. duPont de Nemours & Co. under the trademark "Delrin." These rollers coact with a plurality of pressure rollers 128, 130, 132 and 134 preferably having a somewhat smaller diameter and preferably provided with rubber tires 136 to provide a high friction working surface. We mount feed rollers 128 to 134 on shaft 138 for rotation therewith at spaced locations therealong corresponding to the locations of rollers 120 to 126. A shaft 146 carried by side plates 34 and 36 carried a central actuating arm 140 for rotation therewith. We provide the end of arm 140 remote from shaft 146 with a relatively thin ball bearing which rotatably receives the shaft 138 in such a way as to permit shaft 138 to swivel slightly about its center to equalize the pressure with which rollers 128 to 134 contact rollers 120 to 126. Preferably we provide the assembly with end stabilizer arms 142 and 144 relatively loosely received by shafts 146 and 138. It will be appreciated that shaft 146 and arm 140 support the pressure roller assembly for swinging movement toward and away from the drive rollers. Shafts 138 and 146 and pivot arms 140, 142 and 144 are disposed in such a manner as to permit feed rollers 128 to 136 to engage drive rollers 120 to 126 along a line intermediate the intake point A and the stop fingers 158 to 166. It will be appreciated that cylindrical guide 152 is provided with slots (not shown) to permit engagement of the pairs of rollers.

The pivot shaft 146 carries a crank plate 172, provided with a crankpin 174. The stop finger 174 in shaft 170 carries an arm 178 having a slot 176 formed in the end thereof for receiving pin 170. The armature of a solenoid 180 is connected by a linkage 181 to arm 172 to rotate shaft 146 in a counterclockwise direction against the action of a spring 182 when the solenoid is energized. At the same time fingers 158 to 166 will be retracted. The position of the parts shown in full line in FIG. 5 is the position occupied when the solenoid is energized.

It will be apparent from the above description that the feed rollers 128 to 134 are coupled to stop fingers 158 to 166 through actuator crank plate 172, arm 178 and pivot arms 140 to 144 such that movement of the feed rollers 128 to 134 into engagement with the drive rollers 120 to 126 is accompanied by a movement of the stop fingers 158 to 166 away from the transport path defined by the cylindrical guide 152. Normally, the spring 182 maintains the above-described sheet intake assembly in a disengaged position, shown in FIG. 5, in broken lines in which the feed rollers 128 to 134 are disengaged from the drive rollers 120 to 126 and in which sheets are prevented from further moving along the transport path by fingers 158 to 166. While the intake assembly is in such a disengaged position, the operator may manually insert a sheet of paper into the feeder through the intake point A and align its leading edge against the stop fingers 158 to 166. When the feeder is ready to accept another document for copying, solenoid 180 is actuated to pull the lower end of the feed roller actuator arm 172 toward the rear of the feeder, thereby moving fingers 158 to 166 away from the transport path and moving feed rollers 128 to 134 into engagement with drive rollers 120 to 126 to propel the sheet along the transport path.

The use of low friction drive rollers 120 to 126 together with idling, commonly coupled pressure rollers 128 to 134 provide a document intake assembly which accepts manually fed documents while inhibiting undesirable skewing of the document. While rollers 120 to 126 function as drive rollers, it is important that they permit slippage. If the drive rollers 120 to 126 were high friction, they would tend to forcefully draw in a sheet of paper even if such sheet were initially skewed. By providing a high friction surface on the pressure rollers 128 to 134, a braking action is achieved such that if, for example, the operator continues to hold on to one corner of the sheet after rollers 128 to 138 have engaged rollers 120 to 126, the pressure roller nearest that corner will be stopped, thereby stopping the other pressure rollers 128 to 134, which rotate as a unit. At the same time, the low friction drive rollers 120 to 126 continue to slip against the paper. This combination of the braking action of the pressure rollers 128 to 134 and the slipping action of the drive rollers 120 to 126 provides a balancing action tending to correct the skew. If the pressure rollers 128 to 134 were independently mounted rather than commonly coupled, the side of the sheet of paper not held onto would continue to be driven, increasing the skew. It has also been found that the use of low friction drive rollers, together with a curved intake path, causes wrinkles caused by carelessly fed originals to flatten themselves out.

Upon emerging from the lower end of the cylindrical guide 152, the sheet follows a path defined by the machine platen 20 and rear edge plate 184 and by a guide plate 186 mounted between side plates 22 and 24 in close parallel spaced relationship with the machine platen 20. Guide plate 186 extends over the machine platen 20 and over the edge plate 184 and has a plurality of fingers 188 extending generally upwardly and rearwardly between drive rollers 120 to 126 and pulleys 68 to 82 to minimize the possibility of the sheet of paper being fed to the upper side of the guide plate 186.

A plurality of respective front and rear pressure rollers 190 and 192 positioned opposite belts 100 to 110 maintain the sheet in a close contacting relationship with the machine platen 20 as it advances across the platen's upper surface. We rotatably mount each of the rollers 190 and 192 in a roller support 194 carried by a rod 195 extending from a block 196. A common shaft 198 rotatably supports the front roller blocks while a common shaft 200 supports the rear roller blocks. Rollers 190 and 192 are thus biased against the belts 100 to 110 by the weight of the roller supports 194. If desired, weights may be added to these supports to increase the downward force. Rods 195 are left free to turn within cylindrical blocks 196 to help equalize the force on adjacent belts. We provide guide plate 186 with holes at the appropriate locations to permit rear pressure rollers 192 to contact the sheet of paper or belts 100 to 110.

A housing 202 in front of platen 20 receives a gate 204 which may be moved into the transport path followed by the sheet of paper to stop the sheet for copying. We mount gate 204 for movement laterally and upwardly with respect to the front edge of the platen to permit the actuator to be located at one of the ends of the gate. Preferably, this mounting is accomplished by providing the gate 204 with a plurality of slots 206 spaced along its length. We form slots 206 at an acute angle to the longitudinal axis of the gate. Slots 206 receive guide pins 208 mounted on the inner surface of the rear wall of housing 202. A plurality of upwardly extending fingers 210 on gate 204 move into the space between the belts 98 to 112 when the gate is in operative position. Preferably, the fingers 210 are beveled along one side to permit oblique retracting movement without contacting the belts 98 to 112. A suitable biasing means such as a spring 212 coupled to one end of the gate member 204 normally urge the fingers into a blocking position. A solenoid 214 coupled to the other end of the gate 204 is actuated to move the gate member into a nonblocking position. By mounting the gate member 204 for movement along a path oblique to the edge member 202, as described above, it is possible to arrange the gate assembly linearly, permitting a construction which is both compact and compatible with existing machines.

The sheet of paper is moved along the platen 20 by the transport belts 98 to 112 until the leading edge of the paper abuts the gate fingers 210 and further forward movement is prevented. The transport belts 98 to 112 then slip relative to the sheet of paper while at the same time providing a gentle force which aligns the leading edge of the paper against the fingers if it has become skewed.

When the desired number of copies have been made, the solenoid 214 is actuated to retract the fingers 210 from the paper path to allow the sheet of paper to be discharged from the feeder at a discharge location B. A guide plate 215 carried by front wall 26 has fingers 217 which extend rearwardly and upwardly between adjacent belts 98 to 112 to ensure that a sheet is discharged at location B and is not carried around by the belts. The fingers 217 may be received in notches 219 provided on the underside of guide bar 115. The discharged sheet is directed by a curved guide plate 216 into a collection bin 218 mounted on the front machine wall 14, the guide plate 216 being mounted to the sides of the collection bin 218. The bin has a forwardly canted front wall 220 to permit the sheets to stack against said wall with their front sides facing backwards. By means of this arrangement, originals fed to the feeder last page first to allow the copies to stack properly are collected in the proper order.

Referring now to FIGS. 7 and 8, we have shown an alternative embodiment of our invention having an integral collection tray. In this embodiment, indicated generally by the reference numeral 221, discharged sheets of paper are directed by an upwardly curved guide 222 into the document storage area 32, which, in this embodiment, functions as a collection tray. The discharged sheet is moved along the inner surface of the guide member 222 by a first plurality of drive rollers 225 disposed across said inner surface and by a second plurality of drive rollers 226 disposed across the inner surface at a location spaced downstream from the first plurality of rollers 225. Rollers 225 and 226 coact with first and second pluralities of idler rollers 227 and 228, respectively, mounted opposite the respective rollers 225 and 226 on the other side of the guide member 222. Guide member 222 is provided with slots 229 to suitable locations to permit rollers 227 and 228 to contact rollers 225 and 226, respectively. Rollers 225 and 226 are mounted on shafts 230 and 231 rotatably received by end plates 224. Shafts 230 and 231 are driven from shaft 42 by means of sprocket weels 232 and 233 mounted on the left ends of shafts 230 and 231. Sprocket wheels 232 and 233 in turn are coupled through a drive chain 236 to a sprocket wheel 234 mounted on shaft 42. Rollers 227 and 228 are rotatably mounted on shafts 237 and 238 mounted between the end plates 224.

Referring now to FIGS. 1, 5 and 9, introduction of a document to be copied into the entry A to a location at which the leading edge thereof abuts the fingers 158 actuate the feeler of a switch S1 to close the switch to complete the circuit of motor 96 so that the transport system is driven. At the same time solenoid 180 is energized to move the pressure rollers 128 to 134 into engagement with the document and to move fingers 158 out of the document path. As the leading edge of the document moves under rollers 120 to 126 it engages the feeler of a switch S2 which holds the motor circuit through a delay device d after switch S1 opens as the trailing edge of the document leaves its feeler. When the trailing edge of the document leaves the feeler of switch S2, the delay device d holds the circuit of motor 96 for a period of time sufficient to ensure that the belts 100 move the leading edge of the document into abutting relationship with the teeth 210 of the fence 204.

When the required number of copies have been made any suitable device such as a counter (not shown) momentarily actuates a switch CS to energize a relay winding R. Energization of winding R closes a switch R1 to energize the motor 96 and a switch R2 to energize solenoid 214 to move gate 204 out of the path of the document. As the document moves out of the exit B it closes a switch S3. Relay winding R, when energized also closes a switch R3 to complete its own holding circuit through S3. It will be appreciated that the counter switch remains closed for a period of time sufficient to allow the leading edge of the document to actuate S3. When the trailing edge of the document leaves the feeler of S3 relay R drops out and the operation is complete.

The operation of the form of our document feeder shown in FIGS. 1 to 6 will be apparent from the description given hereinabove. The operation of the alternative embodiment shown in FIG. 7 and 8 is similar to that of the embodiment shown in FIGS. 1 to 6 except, of course, for the manner of stacking. Prior to insertion at the entry A, originals may be either hand-held or, alternatively, placed in a tray 240 mounted on the top of the rear portion of the feeder 221.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A document feeder for a photocopying machine having an upwardly facing imaging platen, which comprises:
   a. a first pulley assembly rotatably mounted along one end of said platen;
   b. a second pulley assembly rotatably mounted along the other end of said platen;
   c. a plurality of endless belts for moving a document across said imaging platen, said belts extending between said first pulley assembly and said second pulley assembly and said belts being disposed at spaced locations along said assemblies;
   d. means for driving one of said pulley assemblies;
   e. means for forming a document entrance port extending along said second pulley assembly; and
   f. means for guiding a document introduced through said entrance port around said arcuate portion and away from said second pulley assembly toward said platen, said guiding means including a plurality of drive rollers mounted on said second pulley assembly between said belts, a plurality of pressure rollers corresponding to said drive rollers, said pressure rollers being selectively movable into engagement with said drive rollers at a point along said arcuate portion; and means for moving said pressure rollers into engagement with said drive rollers to move said document along said arcuate portion.

2. A document feeder as in claim 1 in which said document and guiding means comprises a guide member disposed in concentric relationship with said second pulley assembly along said arcuate partian.

3. A document feeder as in claim 1 which further comprises a pressure plate mounted above said plurality of belts in close parallel spaced relationship with said imaging platen.

4. A document feeder as in claim 1 which further comprises:
   a. a stacking tray disposed above and in substantially parallel spaced relation to said imaging platen; and
   b. means located adjacent to said one end of said platen for guiding a sheet of paper moved across said one end around a 180° upward bend to fall into said stacking tray.

5. Apparatus as in claim 4 in which said guiding means comprises:
   a. an upwardly extending curved guide members disposed adjacent said one end of said imaging platen;
   b. a plurality of inside rollers disposed across the inner surface of said curved guide member;

c. a plurality of outside rollers disposed across the outer surface of said curved guide member to contact said inside rollers, said curved guide member being provided with a plurality of slots to permit said outside rollers to contact said inside rollers; and d. means for driving one of said plurality of inside rollers and said plurality of outside rollers.

6. Apparatus as in claim 5 in which said driving means drives said plurality of inside rollers.

7. Apparatus as in claim 5 in which said inside rollers are first inside rollers and said outside rollers are first outside rollers; and which further comprises a plurality of second inside rollers disposed across the inner surface of said curved guide member at a location spaced from said first inside rollers, a plurality of second outside rollers disposed across the outer surface of said curved guide member at locations corresponding to said second inside rollers, said curved guide member being provided with a plurality of slots to permit said second outside rollers to contact said second inside rollers, and means for driving one of said second inside rollers and said second outside rollers.

8. Apparatus as in claim 7 in which said second plurality driving means drives said second inside rollers.

9. A document feeder as in claim 1 which further comprises a document exit port extending along said one end of said imaging platen, a vertically elongated stacking bin disposed below said exit port, and means for guiding a sheet of paper discharged from said exit port downwardly into said stacking bin.

10. A document feeder as in claim 9 in which said discharge bin has a wall remote from said imaging platen which is canted away from said imaging platen.

11. A document feeder as in claim 9 in which said guiding means comprises a downwardly extending curved guide plate disposed across said exit port.

12. Apparatus as in claim 1, further comprising a frame for supporting said first and second pulley assemblies, said frame being pivotally mounted on said photocopying machine for movement between a first position away from said imaging platen and a second position over said imaging platen in close parallel relation therewith.

13. Apparatus as in claim 1, further comprising a plurality of belt pressure rollers and means for urging said rollers against said belts at points along said imaging platen.

14. In a photocopying machine having an imaging platen and having a plurality of parallel spaced belts for moving a document from one end to the other end of said platen, apparatus for arresting said document along said one end comprising:

a. an elongated gate member having a plurality of upwardly extending fingers corresponding to the spaces between said plurality of belts;

b. means for mounting said gate member along said one end of said machine platen for translational movement between a first position in which said fingers extend between said plurality of belts and a second position in which said fingers are spaced away from said plurality of belts, said movement being along a path which is oblique to said one end of said platen;

c. means for normally biasing said gate member in one of said first and second positions; and d. means for applying an actuating force to said gate member in a direction substantially parallel to said one end to move said gate member into the other of said first and second positions.

15. Document accepting apparatus comprising:

a. a driven pulley assembly;

b. a plurality of spaced belts wrapped around an arcuate portion of said assembly;

c. a plurality of drive rollers mounted on said pulley assembly between said belts; and d. a plurality of pressure rollers spaced across said pulley assembly and selectively movable into engagement with said drive rollers at a point along said arcuate portion to form a nip for accepting documents supplied thereto.

16. Apparatus as in claim 15 in which said pressure rollers are freely rotatable.

17. Apparatus as in claim 15 in which said pressure rollers are undriven.

18. Apparatus as in claim 15 in which the coefficient of friction between the document and the pressure rollers is relatively high compared with the coefficient of friction between the document and the drive rollers.

19. Apparatus as in claim 18 in which the working surfaces of said pressure rollers are formed of rubber.

20. Apparatus as in claim 18 in which said pressure rollers are commonly coupled and freely rotatable.

21. Apparatus as in claim 15 further comprising:

a. a coupling shaft coupling said pressure rollers;

b. a pivot shaft parallel to said coupling shaft; and c. a pivot arm rotatably receiving said coupling shaft at one end and rigidly secured to said pivot shaft at the other end.

22. Apparatus as in claim 21, further comprising first and second stabilizer arms on opposite sides of said pivot arm, each of said stabilizer arms rotatably receiving the coupling shaft at one end and the pivot shaft at the other end.

23. Apparatus as in claim 21, further comprising:

a. a plurality of fingers selectively movable between said plurality of belts at a point along said arcuate portion spaced from said pressure rollers;

b. a shaft supporting said fingers;

c. means for coupling said finger supporting shaft said pivot shaft such that rotation of said finger supporting shaft to move the fingers between the belts causes the pivot shaft to rotate to move the pressure rollers away from the feed rollers.

24. Apparatus as in claim 23 in which said shaft coupling means comprises a first arm mounted on one of said finger supporting shaft and said pivot shaft, said arm carrying a pin, and a second arm mounted on the other of said finger supporting shaft and said pivot shaft, said second arm having a slot formed therein for receiving said pin.

25. Apparatus as in claim 24, further comprising a solenoid and means for coupling the armature of said solenoid to said first arm.

26. Apparatus as in claim 15, further comprising means for arresting the movement of a document beyond a predetermined point along said arcuate portion spaced from said pressure rollers.

27. Apparatus as in claim 26 in which said arresting means comprises a plurality of fingers selectively movable across said predetermined point between said belts.

28. Apparatus as in claim 27, further comprising:

a. means for normally maintaining said pressure rollers and fingers in positions in which said fingers extend between said belts and said pressure rollers are spaced away from said drive rollers; and b. means for selectively moving said fingers away from said belts and concomitantly moving said pressure rollers into engagement with said drive rollers.

29. A document feeder for a photocopying machine having a generally horizontal imaging platen, comprising:

a. a generally horizontal support surface for guiding documents to be copied, said surface being disposed above said imaging platen and having an edge adjacent to an end of said platen;

b. a generally horizontal stacking tray disposed between said imaging platen and said support surface;

c. means for accepting a document moved off said edge and guiding said document downwardly around a first curved path such that the leading edge of said document moves toward said end of the imaging platen;

d. means for moving documents across said end of said imaging platen along said platen to the opposite end thereof; and e. means for guiding documents moving across said opposite end upwardly along a second curved path to discharge said documents into said stacking tray.

30. A document feeder as in claim 29, further comprising a vertically extending alignment guide disposed along one side of the support surface.

31. A document feeder as in claim 29 in which the support surface is upwardly turned adjacent to said edge.

32. A document feeder as in claim 29 in which said stacking tray is staggered with respect to said support surface in the direction away from said edge.

* * * * *

UNITED STATES PATENT AND TRADEMARK OFFICE
CERTIFICATE OF CORRECTION

PATENT NO. : 4,023,791

DATED : May 17, 1977

INVENTOR(S) : Tatsu Hori, Kenneth W. Gardiner, Norman F. Mangal

It is certified that error appears in the above-identified patent and that said Letters Patent are hereby corrected as shown below:

Column 8, line 46, after "document" delete -- and --;

line 48, "partian" should read -- portion --;

line 63, "members" should read -- member --.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*